Figure 1:
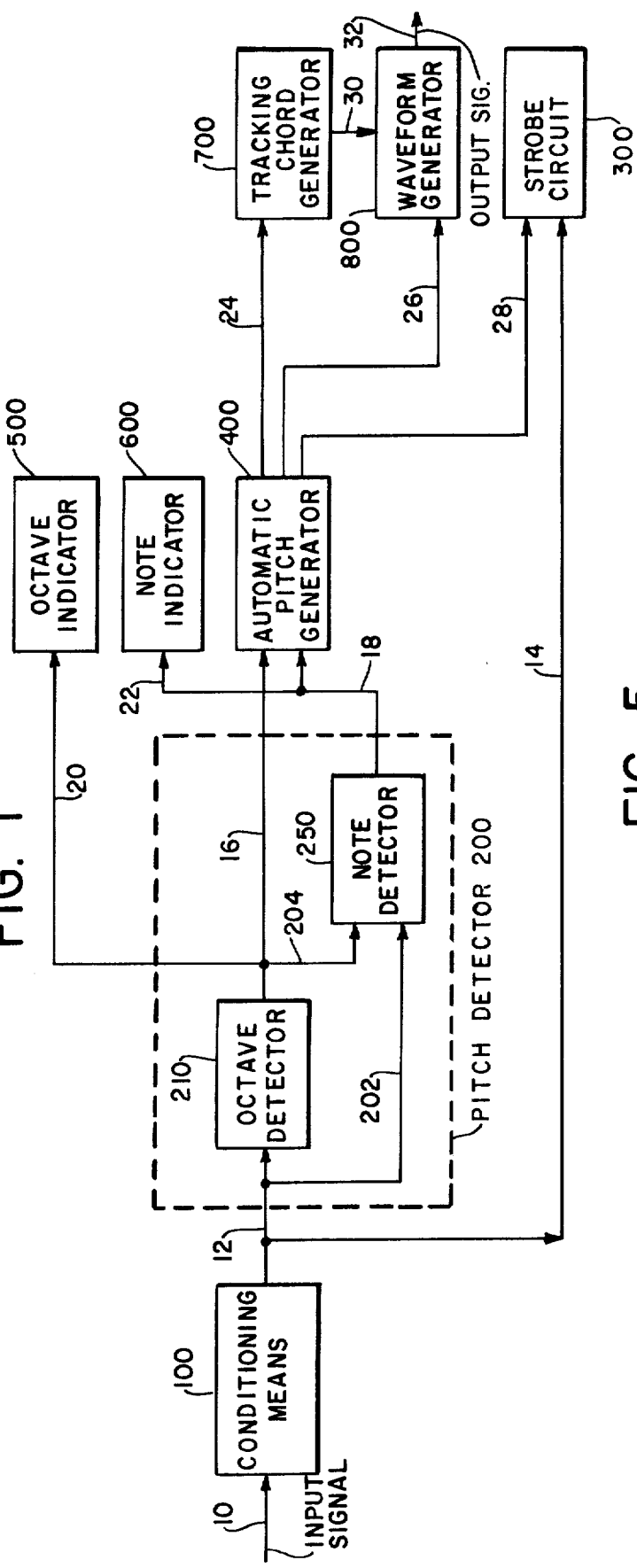

United States Patent [19]

Bommersbach et al.

[11] 4,230,012
[45] Oct. 28, 1980

[54] MUSICAL INSTRUMENT AND METHOD FOR USE THEREIN

[75] Inventors: Wolfgang Bommersbach; Robert A. Dean, Jr., both of Palm Beach, Fla.

[73] Assignee: Bach Laboratories, Inc., West Palm Beach, Fla.

[21] Appl. No.: 806,484

[22] Filed: Jun. 14, 1977

[51] Int. Cl.³ .............. G10H 1/00; G10F 1/00; G10H 1/02; H04M 1/00
[52] U.S. Cl. ............................ 84/1.01; 84/1.03; 84/1.24; 84/DIG. 22; 179/1 SA
[58] Field of Search .............. 84/1.01, 1.03, 1.11, 84/1.19, 1.24, 1.28, 1.12, 1.21, 1.27, DIG. 18, 445, 454, 464, 470, 477; 179/1 J, 1 M, 1 SA, 1 SB, 1 SC, 1 SE, 1 SD

[56] References Cited

U.S. PATENT DOCUMENTS

| | | | |
|---|---|---|---|
| 3,429,976 | 2/1969 | Tomcik | 84/1.12 |
| 3,766,818 | 10/1973 | Prohofsky | 84/454 |
| 3,881,390 | 5/1975 | Gullickson | 84/478 |
| 3,999,450 | 12/1976 | Tsunoo et al. | 84/1.01 |
| 4,024,789 | 5/1977 | Humphrey et al. | 84/477 R |
| 4,056,032 | 11/1977 | Coles | 84/1.01 |
| 4,072,078 | 2/1978 | Shallenberger et al. | 84/1.03 |
| 4,119,005 | 10/1978 | Kondo et al. | 84/1.01 |
| 4,122,751 | 10/1978 | Calvin | 84/454 |

*Primary Examiner*—Vit W. Miska
*Attorney, Agent, or Firm*—Darby & Darby

[57] ABSTRACT

Methods and apparatus are disclosed which are utilized in providing a musical instrument useful for composing, teaching, learning and performing music. The instrument includes a pitch detector which responds to an applied input signal to produce and octave code representing the octave in which the input signal is located and a note code representing the note which is closest in pitch to the input signal. The octave and note codes are applied to display means which indicate the octave and note nearest in pitch to the input signal. The octave and note codes are also applied to an automatic pitch generator wherein they control the dividing down of a high frequency clock signal to produce a true pitch signal having the pitch corresponding to the octave and note codes. The automatic pitch generator also has provision for selectively combining octave and note transpose codes with the octave and note codes to achieve any desired degree of transposition of the true pitch signal. The transposed true pitch signal is applied to a tracking chord generator which internally produces two complete octaves of notes, with the lowest note locked in pitch to the transposed true pitch signal. The chord generator also includes a keyboard which permits the operator to select the notes which are to be included in the harmonic accompaniment produced by the chord generator. However, the actual notes produced, vary in pitch to permit the lowest note to track the transposed true pitch signal. The transposed true pitch signal and the accompaniment from the tracking chord generator combined to produce a composite output signal for the musical instrument.

31 Claims, 7 Drawing Figures

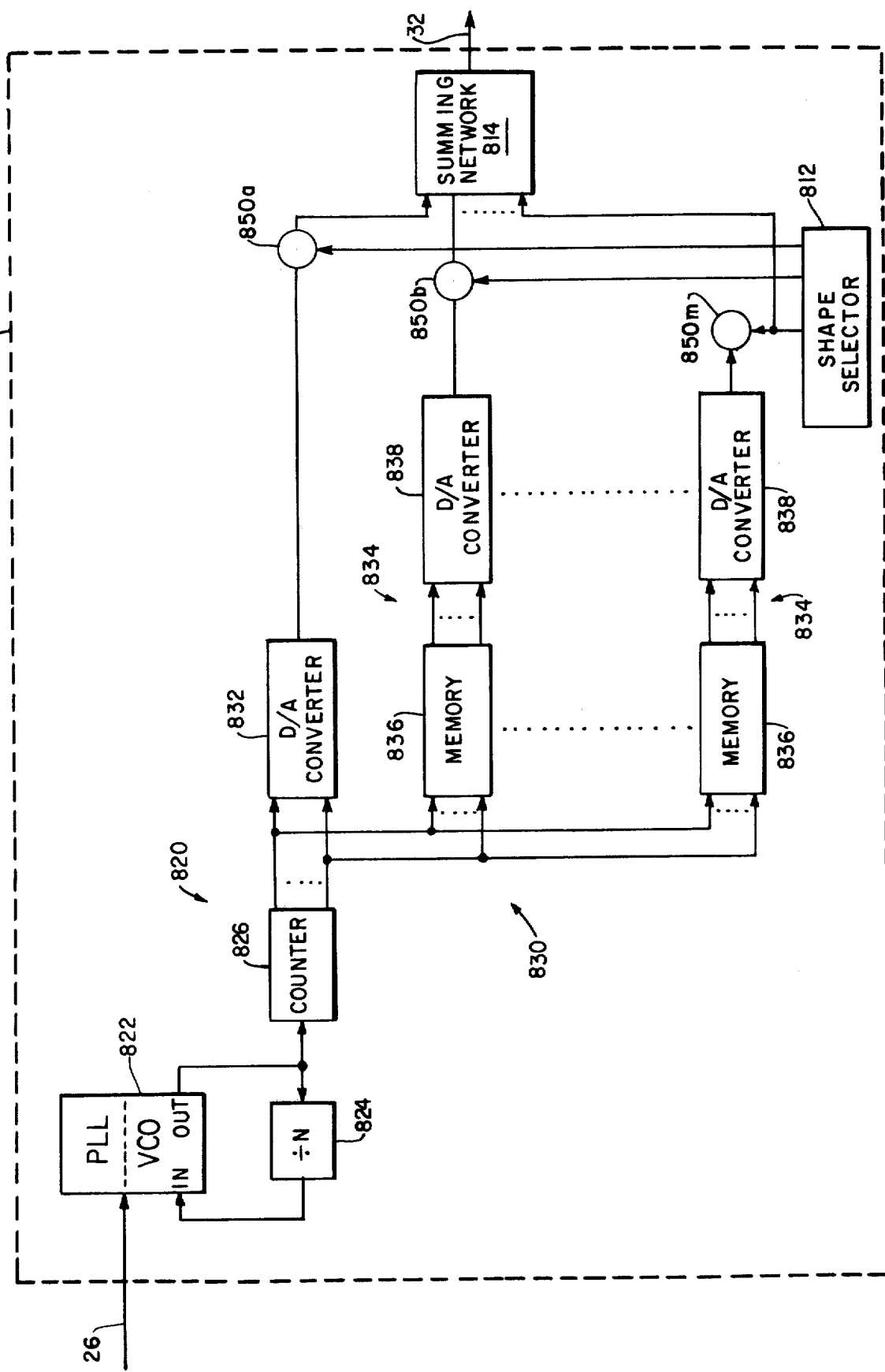

MUSICAL INSTRUMENT AND METHOD FOR USE THEREIN

This invention relates generally to a multiple purpose musical instrument useful in teaching, learning, transcribing and playing music, and more particularly concerns a method and apparatus for use in such an instrument.

Western music is based on a twelve-tone chromatic scale in which the notes are separated by a semitone or half-step. Accordingly, the pitch or frequency of musical sounds is defined along a continuum of scales, called octaves, in which each component note is precisely twice the frequency of the corresponding note in the next lower octave. For the purposes of this description, middle C, having a frequency of approximately 262 hertz, will be defined as $C_4$ and primarily the musical notes included in the range $C_0$ (four octaves below middle C) through $C_8$ (four octaves above middle C) will be of interest. Thus, musical pitch will be defined in a range of eight octaves, each of which includes the following sequence of notes: C, C#("C-sharp"), D, D#, E, F, F#, G, G#, A, A#, and B. Using the foregoing notation, the musical range of a piano would be from $A_0$ to $C_8$.

Although various instruments and aids have long been available for playing, teaching and learning music, there has been no apparatus available which fulfills all major needs of the composer, the performer, the teacher, and the student of music. For example, to help him in transcribing melodies, a composer could use a device into which he could play or sing and receive a display of the notes that were sounded. A student could use a similar device for pitch training in order to assure that a note he is attempting to sound is indeed the correct one. However, from the point of view of the student, it would be more beneficial if the device sounded the correct note, so that the student could attempt to match his note to the correct one. The student would further benefit if some visual indication were provided of the pitch relationship between the note he is sounding and the desired note. This visual indication would also be of benefit in tuning a musical instrument to a predetermined pitch. From the point of view of the performance of music, it would be desirable to have a device which could automatically transpose a played or sung melody to any other key and which could automatically produce a harmonic accompaniment for such melody regardless of the key. A musical device having these features would be of benefit to anyone involved in music.

Broadly, it is an object of this invention to provide a musical instrument which fulfills all of the major requirements of the musician, the composer, the student and the teacher. Specifically, it is an object of this invention to determine, in an electronic instrument, the octave and note closest in pitch to a note sounded by the operator and to indicate the octave and note.

It is another object of this invention to provide a musical instrument which responds to a musical sound produced by an operator by generating the true note nearest in pitch to the sound produced by the operator.

It is yet another object of this invention to provide a musical instrument which responds to a sound produced by an operator by providing a visual indication of the pitch relationship between that sound and the true musical note which is nearest in pitch to that sound.

It is a further object of this invention to provide a musical instrument which permits an operator to transpose a sounded melody into any desired key.

It is yet another object of this invention to provide, in a musical instrument, a harmonic accompaniment for a melody sounded by an operator, which accompaniment tracks the melody sounded by the operator even when he changes key.

It is also an object of this invention to provide a musical instrument achieving all of the foregoing objects, which instrument is convenient, reliable and efficient in use.

In accordance with one aspect of the invention, the octave and note most closely corresponding to a sound produced by the operator are separately determined. The octave in which the input sound lies is first determined and the input sound is shifted upward or downward by the number of octaves required to place it within a predefined octave in which note detection takes place. This permits the note corresponding to the input sound to be determined with equal accuracy regardless of the octave in which the sound lies.

In accordance with another aspect of the invention, octave and note code signals representing, respectively, the octave and note determined to be closest in pitch to an input sound produced by the operator are used as the basis to control the dividing down of a high frequency clock to produce a signal having the determined (true) pitch. By combining the octave and note code signals with selectable octave and note transpose signals, the true pitch can be transposed over the entire range of the musical instrument in musical half-steps.

In accordance with yet another aspect of the invention, a harmonic accompaniment is provided which tracks the pitch variations of a designated signal. Within the device which produces the accompaniment, several octaves of notes are produced, but the lowest note is matched in pitch to the designated signal. If the input sound changes in pitch, all notes shift in pitch so that the lowest note follows the pitch of the designated signal. This arrangement permits the operator to select the combination of notes that will comprise a harmonic accompaniment while having that accompaniment track the designated signal.

In accordance with illustrative embodiments demonstrating objects and features of the present invention, there is provided a multiple function electronic musical instrument. The instrument includes a pitch detector which responds to an applied input signal to produce an octave code representing the octave in which the input signal is located and a note code representing the note which is closest in pitch to the input signal. The octave and note codes are applied to display means which indicate the octave and note nearest in pitch to the input signal. The octave and note codes are also applied to an automatic pitch generator wherein they control the dividing down of a high frequency clock signal to produce a true pitch signal having the pitch corresponding to the octave and note codes. The automatic pitch generator also has provision for selectively combining octave and note transpose codes with the octave and note codes to achieve any desired degree of transposition. The true pitch signal is applied along with the input signal to a strobe circuit which indicates the pitch relationship between the input signal and the true pitch signal. The transposed true pitch signal from the automatic pitch generator is applied to a tracking chord generator which internally produces two complete octaves of notes with the lowest note locked in pitch to the transposed pitch signal. The chord generator also includes a keybord which permits the operator to select the notes which are to be included in the harmonic accompaniment produced by the chord generator. The actual notes produced, however, vary in pitch to permit the lowest note to track the transposed true pitch signal. The transposed true pitch signal and the accompaniment from the tracking chord generator are applied to a waveform generator which can be operated to apply any of several forms of waveshaping to the true pitch signal and which also combines the shaped true pitch signal with the accompaniment, thereby producing a composite output signal for the musical instrument.

In a first illustrative embodiment, the octave code is produced by applying the input signal to a frequency-to-voltage converter which produces an output voltage signal having an amplitude proportional to the frequency of the input signal. The resulting voltage signal is then compared in amplitude to a number of reference voltages, each of which represent a reference point in an octave of the musical instrument. The reference voltage nearest in amplitude to the voltage signal from the frequency-to-voltage converter is thereby determined and an octave code is generated which corresponds to that reference voltage, thereby producing a code word corresponding to the octave of the input signal. The note code is similarly produced. However, prior to applying the input signal to the frequency-to-voltage for note encoding, the input signal is first shifted in frequency to place it into a predetermined octave. Thus, generation of the note code and the required note detection can be performed in a single, predetermined octave instead of over all octaves of the musical instrument.

In a second illustrative embodiment, the octave and note corresponding to the input signal are determined by counting the number of high frequency clock pulses occurring in a predetermined portion of each cycle of the input signal. The octave code is obtained by applying the pulse count to a priority encoder which produces a code corresponding to the octave code. The note code is generated by first dividing down the clock signal to provide a plurality of lower frequency signals having frequencies related by a power of 2. One of these signals is then selected for counting in a counter during the predetermined portion of each cycle of the input signal. The particular signal selected for application to the counter is determined by the octave in which the input signal lies (i.e., the value of the octave code) and will vary as input signals in different octaves are applied. This permits pulses always to be counted within a predefined range of counts corresponding to a single octave instead of over the range of counts corresponding to all eight octaves. The count of the counter is then applied to a memory which is pre-programmed to resolve each count of the counter to one of twelve output codes representing the twelve notes of a scale.

Figure 5:
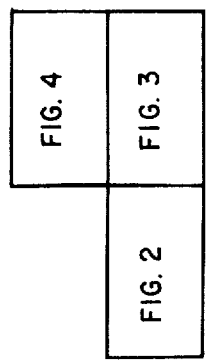
Figure 2:
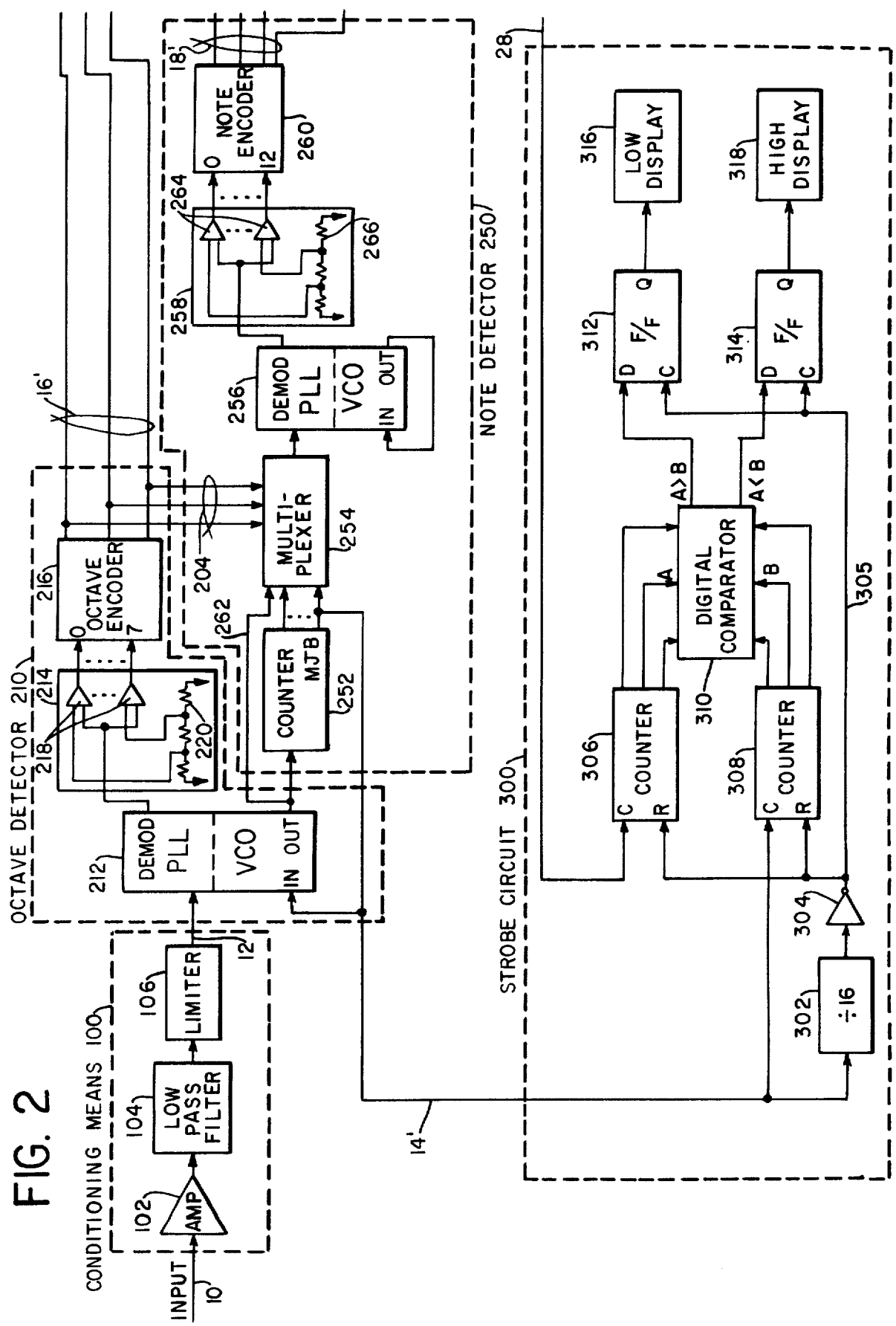
Figure 3:
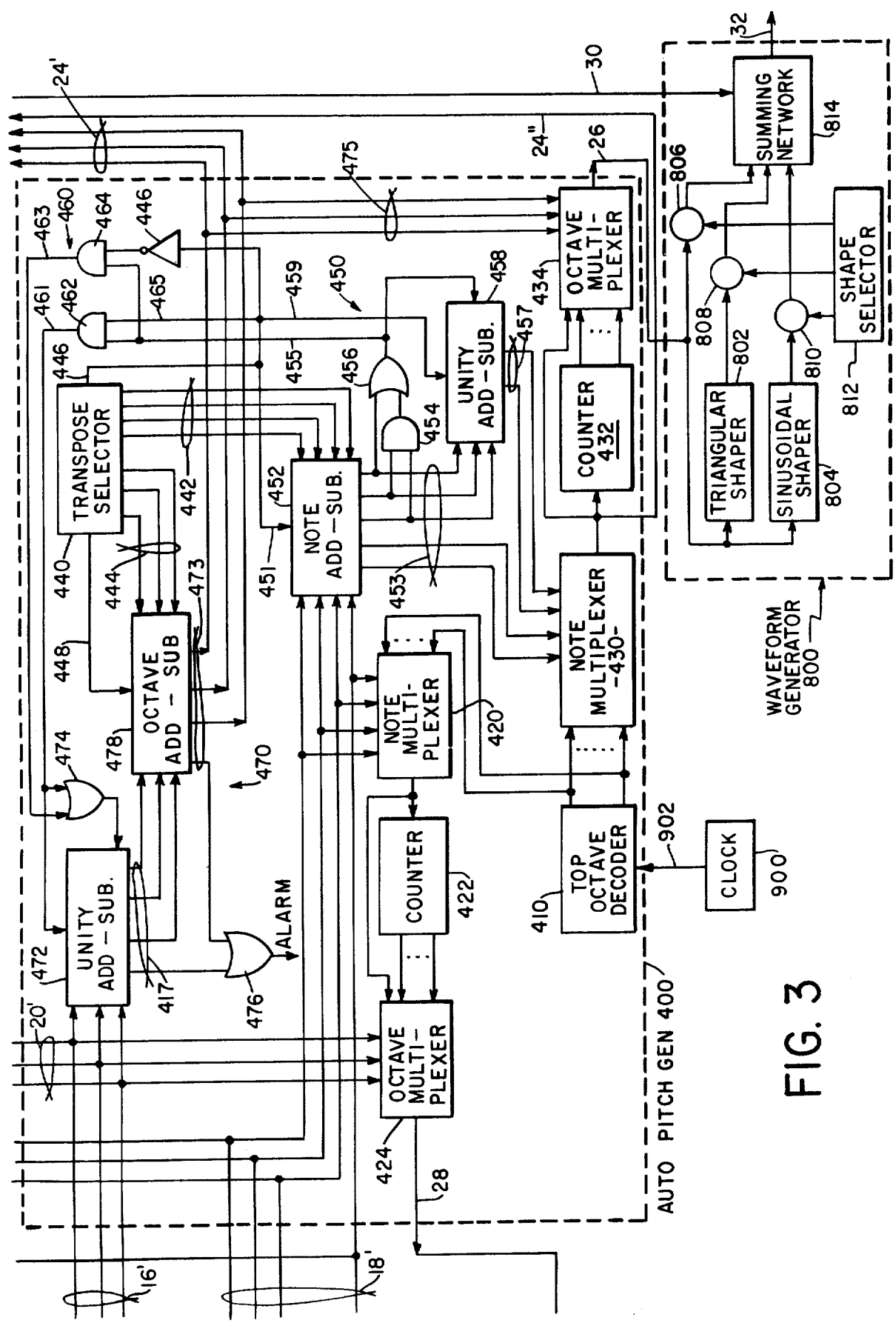
Figure 4:
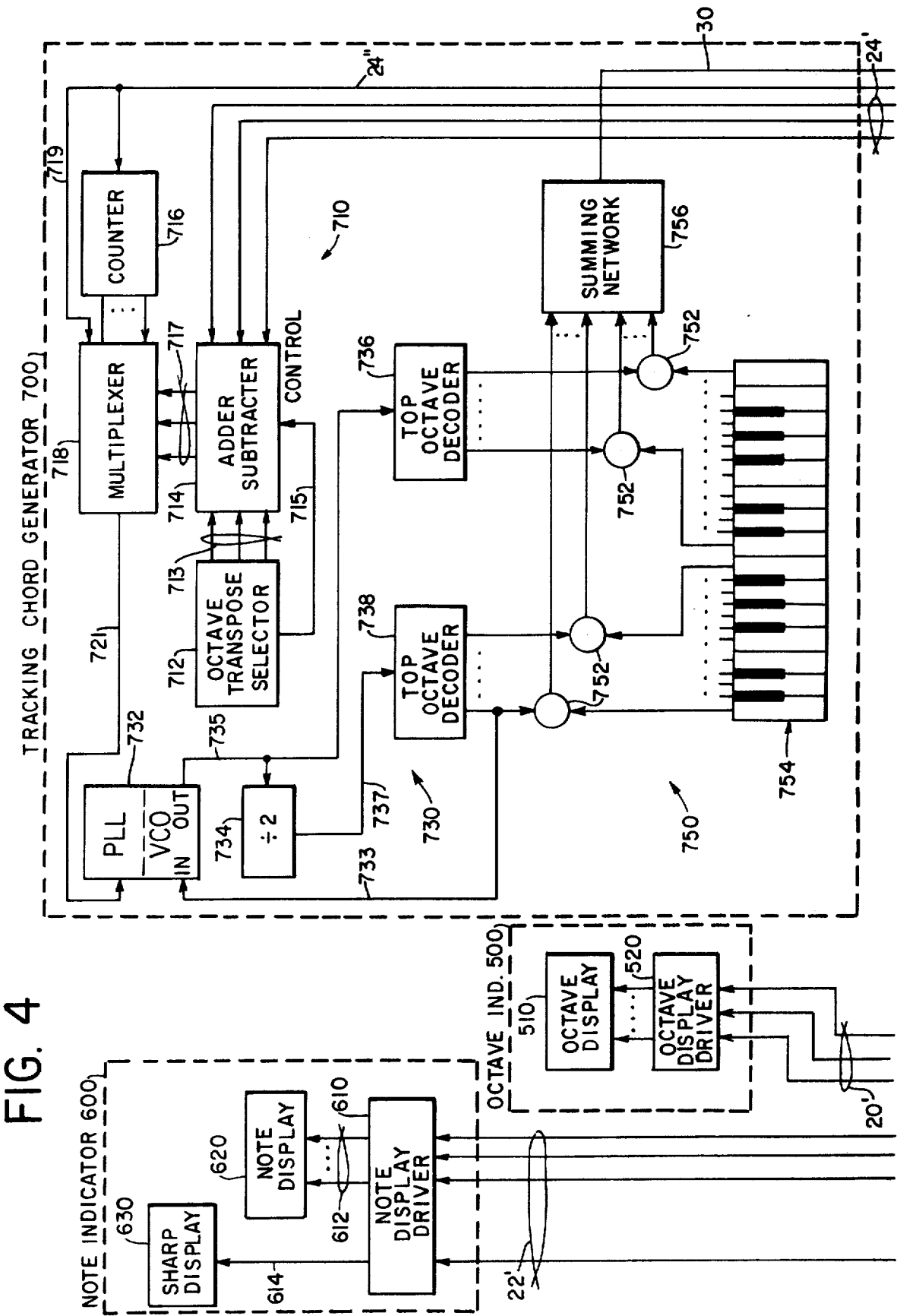
Figure 6:
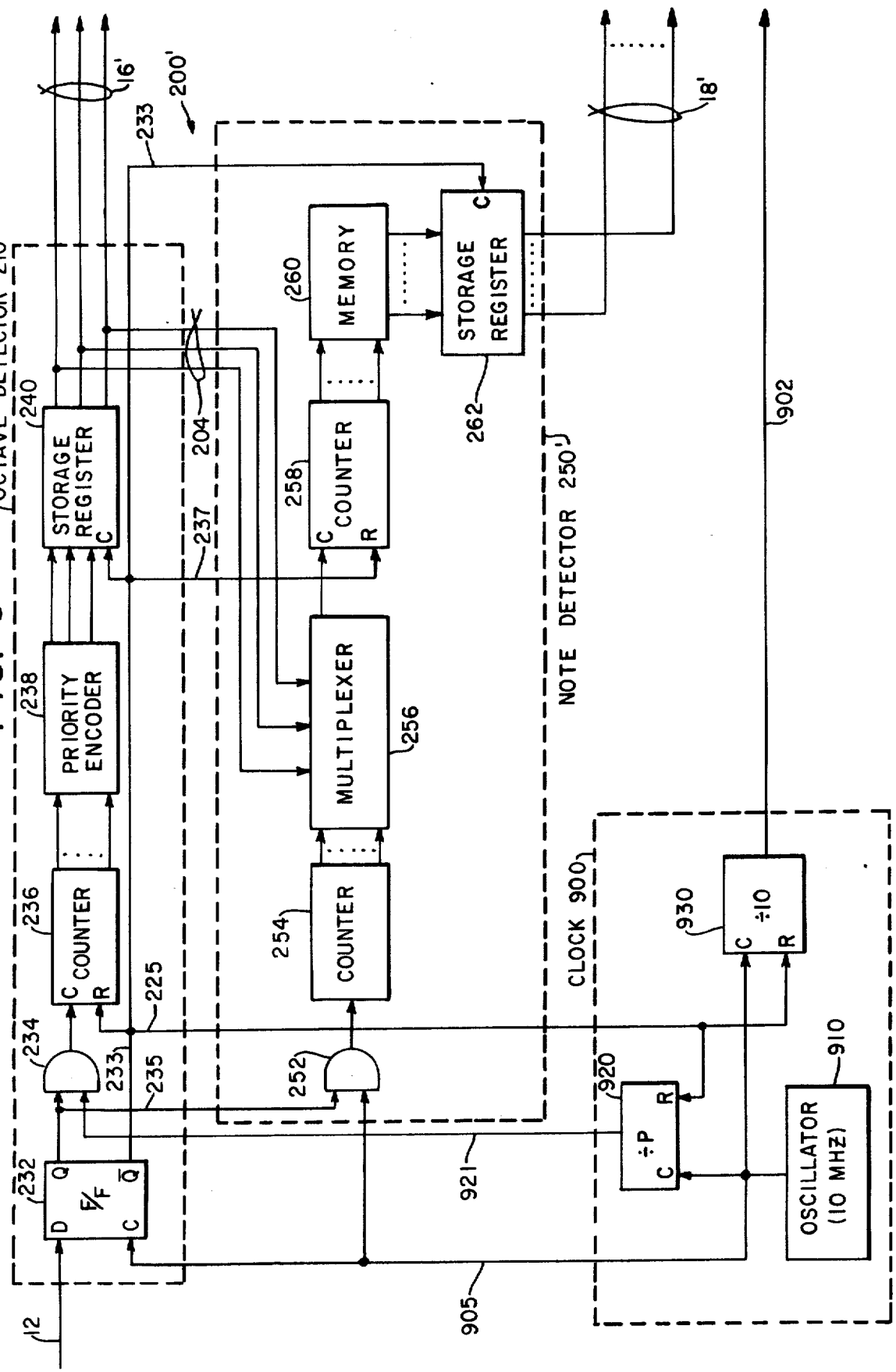

The foregoing brief description, as well as further objects, features and advantages of the present invention, will be more completely understood by reading the following detailed description of presently preferred, but nonetheless illustrative, embodiments thereof, with reference being had to the accompanying drawing, wherein:

FIG. 1 is a functional block diagram of a multiple function electronic musical instrument in accordance with the present invention;

FIGS. 2, 3 and 4, when arranged as shown in FIG. 5, provide a circuit schematic diagram of a first preferred embodiment of the instrument of FIG. 1;

FIG. 6 is a circuit schematic diagram showing an alternate embodiment 200' of pitch detector 200 of FIG. 2 and includes further details for clock 900 of FIG. 3; and FIG. 7 is a circuit schematic diagram showing an alternate embodiment 800' of waveform generator 800 of FIG. 3.

Referring in detail to FIG. 1, there is shown a functional block diagram of a multi-purpose electronic musical instrument 5 incorporating objects and features of the present method and apparatus inventions. The input signal applied to the instrument 5 via lead 10 is an electrical representation of musical sound, for example, the signal produced by a microphone into which the user sings or plays a musical instrument. Instrument 5 will operate with all musical pitches ranging from $C_0$ to $C_8$. Conditioning means 100 processes the input signal to put it in a form which is most readily used within the instrument 5. This processing may include, for example, amplification and filtering which remove overtones and emphasize the fundamental frequency of the input signal. The output signal from conditioning means 100 is provided to pitch detector 200 via lead 12 and to strobe circuit 300 via leads 12 and 14.

Pitch detector 200 broadly comprises an octave detector 210 which receives the signal from conditioning means 100 via lead 12 and a note detector 250 which receives the same signal via leads 12 and 202. The output signal of octave detector 210 is provided, via lead 204, as a control signal to note detector 250 via lead 204 and is further provided to automatic pitch generator 400 via lead 16 and to octave indicator 500 via leads 16 and 20. The output signal from note detector 250 is provided to automatic pitch generator 400 via lead 18 and to note indicator 600 via leads 18 and 22.

Automatic pitch generator 400 provides a first output signal to tracking chord generator 700 via lead 24, a second output signal to waveform generator 800 via lead 26, and a third output signal to strobe circuit 300 via lead 28. The output signal from tracking chord generator 700 is applied to waveform generator 800 via lead 30, and the output signal of the entire musical instrument is provided from waveform generator 800 on lead 32.

In operation, an input signal is provided which has a strong fundamental frequency component within the range of the musical instrument 5. Conditioning means 100 operates on the input signal to emphasize this fundamental frequency. Octave detector 210 senses the octave range in which the fundamental frequency lies and produces a signal representative of that range. Note detector 250 determines which of the twelve notes within the detected octave most closely corresponds in frequency to the fundamental frequency of the input signal and produces an output signal representing that note. The octave signal produced by octave detector 210 is used to control note detector 250 so that its note detection is always performed within a predefined frequency range, for example, within the highest octave. Octave indicator 500 displays the octave in which the input signal lies and note indicator 600 displays the note within that octave which is closest in frequency to the input signal. Automatic pitch detector 400 responds to the octave and note signals produced by the respective detectors to produce: on lead 24, a signal having the frequency of the top octave note corresponding to the detected note; on lead 26, a signal having the frequency of the detected note, which signal may be selectively frequency shifted or transposed in musical half steps over the entire range of the instrument 5; and on lead 28, a signal having the frequency of the detected note without transposition. Strobe circuit 300 compares the fundamental frequency of the input signal and the frequency of the detected note to indicate when they are unequal and whether the fundamental of the input signal is less than or greater than the frequency of the detected note. Tracking chord generator 700 produces a harmonic accompaniement which tracks the detected pitch and changes therewith. Waveform generator 800 provides frequency shaping to the note signal produced on lead 26 and the accompaniement produced on lead 30, and also combines these two signals. The output signal produced on lead 32 is appropriate for application to additional electronic equipment, such as a moog synthesizer, or may be applied directly to a speaker system through an audio amplifier.

From the foregoing description it will be appreciated that the apparatus of FIG. 1 is capable of performing many useful musical functions. For example, the indicators 500, 600 display the octave and note of any musical tone that is sounded (the input signal), so that the apparatus is useful as a music transcribing device, as well as a device to teach music. Moreover, the apparatus has even further utility as a teaching device, because it produces the note which is nearest in pitch to the input signal and serves to correct the student when he sings or plays off key (i.e. he hears that his note does not match the note being produced by the instrument and can easily produce a match with the aid of the visual indication from strobe 300). The visual indication from strobe circuit 300 is also useful for tuning other instruments. Tracking chord generator 700 makes the instrument useful as a general accompaniment instrument. With it, it is possible to sing or play a tune (the input signal) and to have the tune and a harmonic accompaniement automatically produced at the output of the instrument 5. Waveform generator 800 permits the ultimate sound quality of the instrument to be changed and also permits the production of various waveshapes which are useful in other electronic musical instruments.

From the foregoing description, it will also be appreciated that the invention contemplates a method of detecting the pitch of the input signal in which the octave range is first determined. The input signal is then transformed, as described in more detail hereinafter, to permit detection of the note within a fixed octave range. Also, a signal having the detected pitch is produced by selectively dividing a high frequency clock, as described in detail below, with the degree of division being controlled by the note and octave detected for the input signal. In addition, a tracking accompaniment is achieved by locking the frequency of the lowest note produced in chord generator 700 to the frequency of the input signal.

The specific embodiments of the invention described hereinafter will incorporate various conventional analog and digital circuit building blocks which are generally described below.

Three types of logic gates will be employed: inverters, AND gates, and OR gates. An inverter has a single input and a single output which is always the complement of the input (i.e., the output always assumes the opposite condition of the input). An AND gate has a plurality of inputs and has a single output which assumes a high or logical 1 condition only when all of the inputs are high. An OR gate has a plurality of inputs and a single output which assumes a logical 1 or high condition when any of the inputs is high.

Two types of storage elements are employed: D type flip-flops and storage registers. A D flip-flop has a D or data input, a C or clock input, and two complementary outputs Q and $\bar{Q}$. Upon the occurrence of a positive-going transition at the clock input, the Q output assumes the logical condition that the signal at the D input had immediately prior to the positive going clock transition. The $\bar{Q}$ output assumes the opposite condition. A storage register consists of a plurality of D flip-flops connected in parallel to store a multi-bit word. The register has a single clock input C, a plurality of data inputs and a plurality of outputs.

A counter has a C or clock input, an R or reset input, and a plurality of output bits defining the count of the counter. With the R input low, the count of the counter is incremented on each positive going transition of the signal applied to the C input, so that the counter repetitively cycles from a zero count to its maximum count. When the R input is high, the counter is reset to the zero count. The size of the counter is defined in terms of the number of stages or output bits it has. Thus, an N bit counter is capable of counting from 0 to $2^N$. A divided-by-P counter is a conventional counter which has a single output, incorporates logic to reset the counter after a count of P is reached, and produces a pulse at the output only when such a count is reached. In effect, the counter produces a pulse train having 1/P, the frequency of a pulse train applied as an input signal to it.

A multiplexer has a plurality of information inputs, a plurality of control or address inputs, and a single output. By design, there is a unique address or control word corresponding to each of the information inputs, and the occurrence of this word will cause the corresponding information signal to be transmitted to the output.

A digital comparator has two multi-bit binary input words A and B, and three binary outputs indicated as $A > B$, $A = B$, and $A < B$. In operation, the comparator compares the words A and B and produces a high at the output corresponding to the magnitude relationship of these two words.

A top octave decoder is a circuit element commonly used in musical instruments. The decoder has a single input adapted to receive a high frequency clock and provides 13 output signals, each of which is divided down from the clock by a different amount, so that the output signals correspond to the frequencies of a complete musical scale plus one note. A typical top octave decoder is designed to produce the notes $C_7$ through $C_8$ when a 1 megahertz clock signal is applied thereto.

A priority encoder has a multi-bit binary input word and a multi-bit binary output word. Each input bit is assigned a priority and there is a unique output code word corresponding to each input bit. In operation, the encoder output word is the code word corresponding to the highest priority input bit having a logical 1 level thereon.

Two types of memory circuits are employed: read only memory (ROM) and random access memories (RAM). Both types of memories have a multi-bit input address word and a multi-bit output word. The address word accesses a particular storage location within the memory in which an output word is stored so that that output word can be provided as the output of the memory. An ROM is usually specially designed to provide particular output words in response to each input word. An RAM, on the other hand, is usually programmable in that the individual storage locations may be accessed for storing particular words therein as well as for reading words therefrom.

A parallel adder performs the addition of two multi-bit binary input words, A and B, to produce a multi-bit binary output word of which the most significant bit is the carry output bit. In addition to the words A and B, a parallel adder also includes a binary carry in (input) bit. As is well known in the art, a parallel adder can be used to perform subtraction of the word A from the word B by inverting all the bits of the word B prior to application to the input of the adder and by feeding the carry output bit back to the carry input bit. It is, therefore, common to convert a parallel adder to an adder-subtracter unit by providing logic circuitry to invert the bits of the B word and to enable the feedbck of the carry output bit to the carry input bit. A single binary control signal is employed to enable the inversion of the B word and the feedback of the carry output bit to the carry input bit. In this description, the A word in an adder-substracter will alternately be referred to as the added word and the B word will be referred to as the subtracted word.

An analog comparator is an analog circuit which receives analog reference input and information input signals and produces a logical 1 output when the information input signal exceeds the reference input signal and a logical 0 output otherwise.

A digital-to-analog converter is a circuit which receives a multi-bit binary input word and which, at its output, provides an analog voltage signal having an amplitude proportional to the magnitude of the binary input word.

A phase-locked loop (PLL) includes an analog information signal input, a voltage controlled oscillator (VCO) input, a demodulator output, and a VCO output. In operation, the PLL is used as a control loop which matches the phase of the VCO output to that of the information input. This requires that the VCO output be fed back either directly or through some additional circuitry to the VCO input. The overall effect of the phaselocked loop is that the error between the information input and the VCO input is reduced towards 0 by adjusting the VCO output. This causes the frequency of the VCO input signal to be the same as that of the information input signal. The modulator output is a frequency demodulated version of the information input signal. Thus, this output is a voltage signal in which the amplitude is proportional to the frequency of the information input signal, so that the PLL can effectively be used as a frequency-to-voltage amplitude converter.

FIGS. 2, 3 and 4, when arranged as shown in FIG. 5, illustate further details of a preferred embodiment of the apparatus invention. In the resulting diagram, the functional blocks corresponding to the blocks of FIG. 1 are shown in phantom and are indicated by the same nomenclature and reference characters as are used in FIG. 1.

CONDITIONING MEANS 100

In conditioning means 100, the input signal passes from lead 10 through an amplifier 102, a low pass filter 104 and a limiter 106 and appears in reconditioned form on lead 12. Amplifier 102 is a conventional audio frequency amplifier and produces an enhanced version of the input signal. Filter 104 is a conventional low pass filter which is designed to block frequencies above approximately 4 KHz, so that higher frequency overtones included in the input signal are blocked. Limiter 106 is a conventional limiter and confines the amplitude of the output signal from filter 104 between certain predefined positive and negative limits. As a result of the cooperation of the three foregoing elements, the signal produced on lead 12 is a squared-up version of the fundamental frequency of the input signal.

OCTAVE DETECTOR 210

Octave detector 210 includes: a phase-locked loop 212 connected to receive the signal on lead 12 as its information input signal; a comparator network 214 responsive to the demodulator output of phase-locked loop 212; and an octave encoder 216 connected to receive the output signals from the comparators of comparator network 214. In operation, the voltage amplitude of the demodulator output signal of phase-locked loop 212 is proportional to the frequency of the signal appearing on lead 12 so that the phase locked loop acts as a linear frequency-to-voltage-amplitude converter.

Comparator network 214 includes a plurality of conventional comparators 218, each of which receives, as a first input, the demondulator output of phase-locked loop 212. The second input to each of comparators 218 is provided from a different junction in a serial string 220 of precision resistors, which is connected across a voltage reference source (not shown). The value of the voltage reference source and of the individual resistors in string 220 are selected to provide predetermined reference voltages at each of the tapping points of the resistor string 220. Each of the reference voltages is designed to correspond to the lower boundary of the range of a corresponding octave of the instrument 5. Consequently each reference voltage corresponds to a voltage that is produced at the modulator output of phase-locked loop 212 when the input to the phase-locked loop is the lowest frequency that is to be detected within the corresponding octave. Furthermore, the demodulator output of phase-locked loop 212 and the reference voltages from resistor string 220 are connected to the comparators 218 so as to produce a high or logical 1 output when the signal from the phase-locked loop exceeds the corresponding reference voltage amplitude and a low or logical O level otherwise. From the foregoing, it will be appreciated that only those comparators which have a reference voltage that is exceeded by the demodulator signal from phase-locked loop 212 will produce a logical 1 output and that each of the comparators with a reference voltage which exceeds the signal from phase-locked loop 212 will produce a logical O output.

On leads 16', octave encoder 216 produces a binary code word representing the comparator with the largest amplitude reference voltage which also has a logical 1 output. The function of octave encoder 216 is realized, for example, with a conventional eight bit priority encoder. In the preferred embodiment, the octaves are encoded as shown in the following Table I:

TABLE I

| Octave | Code |
|--------|------|
| 0 | 000 |
| 1 | 001 |
| 2 | 010 |

TABLE I-continued

| Octave | Code |
| --- | --- |
| 3 | 011 |
| 4 | 100 |
| 5 | 101 |
| 6 | 110 |
| 7 | 111 |

NOTE DETECTOR 250

Note Detector 250 includes counter 252, multiplexer 254, phase-locked loop 256, comparator network 258 and note encoder 260. Counter 252 enumerates pulses produced at the VCO output of phase-locked loop 212, the individual bits comprising the count of counter 252 are provided to the information signal inputs of multiplexer 254, and the most significant bit of counter 252 is fed back to the VCO input of phase-locked loop 212. Multiplexer 254 receives the VCO output of phase-locked loop 212, via lead 262, as an additional information input, and the output code of octave encoder 216 is applied to the control inputs of multiplexer 254 via leads 204. In phase-locked loop 256, the output signal of multiplexer 254 is received as the information input signal, the VCO output is fedback to the VCO input, and the demodulator output is provided as an input signal to comparator network 258. The output signals from comparator network 258 are provided as inputs to note encoder 260, which produces a multi-bit binary output code on leads 18'.

Comparator network 258 is similar to comparator network 214 of octave detector 210. Comparator network 258 includes a plurality of conventional comparators 264, each of which receives as a first input the demodulator output of phase-locked loop 256. The second input to each of comparators 264 is provided from a different junction in a serial string 266 of precision resistors, which is connected across a voltage reference source (not shown). The value of the voltage reference source and of the individual resistors in string 266 is selected to provide predetermined reference voltages at each of the tapping points of the resistor string 266. Each of the reference voltages is designed to correspond to the lower boundary of the range in which a corresponding note in the top octave of the instrument 5 is to be detected. Consequently, each reference voltage corresponds to a voltage that is produced at the modulator output of phase-locked loop 256 when the input to the phase-locked loop is the lowest frequency that is to be detected as the corresponding note. Furthermore, the demodulator output of phase-locked loop 256 and the reference voltages from resistor string 266 are connected to the comparators 264 so as to produce a high or logical 1 output when the signal from the phase-locked loop exceeds the corresponding reference voltage amplitude and a low or logical O level otherwise. From the foregoing, it will be appreciated that each of the comparators 264 which has a reference voltage that is exceeded by the signal from phase-locked loop 256 will produce a logical 1 output and each of the comparators having a reference voltage which exceeds the signal from phase-locked loop 256 will produce a logical O output.

Note encoder 260 produces, on leads 18', a binary code word representing the comparator with the largest amplitude reference voltage which also has a logical 1 output. The function of note encoder 260 is realized, for example, with a conventional twelve bit priority encoder. In the preferred embodiment, the notes are encoded as shown in the following Table II:

TABLE II

| Note | Code |
| --- | --- |
| C | 0000 |
| C# | 0001 |
| D | 0010 |
| D# | 0011 |
| E | 0100 |
| F | 0101 |
| F# | 0110 |
| G | 0111 |
| G# | 1000 |
| A | 1001 |
| A# | 1010 |
| B | 1011 |

Phase-locked loop 212 tends to lock the VCO input signal to the signal received via lead 12. However, the VCO input signal is fed back from the most significant bit of counter 215, which is the most slowly varying output signal of the counter. As a practical matter, the input signal to an n bit counter has twice the frequency of the least significant output bit signal, and each other output bit signal of the counter has precisely twice the frequency of the output bit signal of next higher significance. Inasmuch as the information input signals to multiplexer 254 are the output bits of counter 252 and the input to the counter as received via lead 262, the various inputs to the multiplexer are, respectively, at the frequency of the signal appearing on lead 12, at twice that frequency and at every power of 2 of that frequency up to $2^n$ (assuming counter 252 is an n bit counter). It will therefore be appreciated that multiplexer 254 receives as its information inputs the signal on lead 12 and the corresponding note in each of the higher octaves. The information input signals to multiplexor 254 are connected so that, when the code word for the top octave appears on the leads 204 the most significant bit is transmitted through multiplexer 254, and so that codes corresponding to successively lower octaves cause the transmission of bits of successively lower significance (and higher frequency) through multiplexer 254. For example, when the signal on lead 12 is in the top octave, the code word on leads 204 causes multiplexer 254 to transmit the most significant bit of counter 252, which is at the same frequency as the signal on lead 12. On the other hand, when the signal on lead 12 is in the lowest octave, the signal on leads 204 causes multiplexer 254 to transmit that one of its information input signals (i.e., that multiple of the most significant bit signal) which is in the top octave. Consequently, the input signal to phase-locked loop 256 is always in the top octave and, regardless of the frequency of the signal on the 12, the demodulator output of phase-locked loop 256 is always in the relatively small voltage range corresponding to the top octave. Moreover, since the top octave has the greatest frequency separation between notes, phase-locked loop 256 is operated in the octave in which the maximum voltage amplitudes are produced at the demodulator, whereby comparator network 258 always operates in the range of maximum resolution. As explained above, comparator network 258 and note encoder 260 cooperate to produce on leads 18' a code word representing that note which is closest in frequency to the input signal to phase-locked loop 256. This is also the note which is closest in frequency to the signal appearing on lead 12, so that the code word appearing on leads 18' indicates that note which is closest in frequency to the input signal to instrument 5.

STROBE CIRCUIT 300

Strobe circuit 300 provides a visual indication of the frequency relationship between the input signal and the musical note which is nearest in frequency thereto. Strobe circuit 300 includes a divide-by-16 counter 302, an inverter 304, a pair of counters 306, 308; a digital comparator 310; a pair of storage flip-flops 312, 314; a low display 316; and a high display 318. A pulse train signal having the frequency of the input signal is provided, via lead 14', from octave decoder 210 to the C input of counter 308 and divide-by-16 counter 302. The output of counter 302 is coupled via inverter 304 to the R inputs of counters 306 and 308 and via inverter 304 and lead 305 to the C inputs of flip-flops 312 and 314. The C input to counter 306 is provided via lead 28 from automatic pitch generator 400 and comprises a pulse train having the frequency of the note, here referred to as the true note, which is nearest in frequency to the input signal. The count of counter 306 is provided as the A word to digital comparator 310 and the count of counter 308 is provided as the B word to the digital comparator. The A$\frac{1}{2}$B output of the digital comparator is provided to the D input of flip-flop 312, which drives the low display 316, and the A$\frac{1}{2}$B output of the digital comparator is provided to the D input of flip-flop 314 which drives high display 318.

Low display 316 and high display 318 may be any conventional form of display circuit. In the preferred embodiment, each of the displays includes a conventional drive amplifier and a light source, such as a light-emitting diode. Preferably, the light source for the low display emits a different color of light than the light source for the high display.

In operation, counter 308 counts pulses on lead 14' (at the frequency of the input signal) and counter 306 counts pulses on lead 28 (at the frequency of the note which is closest in frequency to the input signal). Both counters are reset by the negative-going transitions of the output signal from counter 302 (i.e. the positive-going transitions at the output of inverter 304) which is at 1/16 of the frequency of the input signal. During the same transitions, the flip-flops 312 and 314 are clocked. Digital comparator 310 continuously compares the count of counter 306 with the count of counter 308, the D inputs to flip-flops 312 and 314 being a logical 1 and a logical 0, respectively, when counter 306 has the higher count and being a logical 0 and a logical 1, respectively, when counter 308 has the higher count. The flip-flops are only clocked, however, every sixteenth cycle of the input signal on the negative-going transition at the output of counter 302, and, at this time, each of the flip-flops assumes the state of the corresponding output of digital comparator 310. Thus, the states of the flip-flops indicate the relative number of pulses occuring on leads 14' and 28 during sixteen cycles of the input signal. In this manner the relative frequencies between the signals on leads 14' and 28 are served. The displays 316, 318 are designed to illuminate the corresponding light-emitting source when the corresponding one of flip-flops 312,314 has a high output. The color difference in the emitted light permits the operator to tell at a glance what the frequency relationship is between the note he is applying to instrument 5 and the true note.

AUTOMATIC PITCH GENERATOR 400

Automatic pitch generator 400 is controlled by the octave code and note code produced on leads 16 and 18, respectively, by pitch detector 200 to produce, on lead 28, a signal having the frequency of the note which is nearest in frequency to the input signal and, on lead 26, a transposed version of the signal on lead 28. The signal on lead 26 may be selectively transposed by any integral number of musical half-steps with respect to the signal appearing on lead 28 so long as it remains within the range of the instrument 5. In automatic pitch generator 400, note multiplexer 420, counter 422, and octave multiplexer 424 cooperate with top octave decoder 410 to produce the signal on lead 28, and note multiplexer 430, counter 432, and octave multiplexer 434 cooperate with top octave decoder 410 to produce the signal on lead 426. The remaining components of automatic pitch generator 400 cooperate to permit selection and control of the transposition of the signal on lead 26 with respect to the signal on lead 28.

Top octave decoder 410 receives a signal of a fixed predetermined frequency from clock 900 and, at its output leads, provides signals having the frequencies of the notes in the top octave of instrument 5. Clock 900 may be any conventional form of of oscillator. However, since the accuracy of the pitch produced by automatic pitch generator 400 depends intimately on the accuracy of the frequency produced by clock 900, this component should be a precision oscillator, preferably a crystal oscillator. The frequency of clock 900 is selected to produced frequencies corresponding to the top octave notes at the outputs of top octave decoder 410. In the preferred embodiment, 1 MHz clock is used, so that the top octave is octave 7.

The output signals of top octave decoder 410 are provided as the information input signals to note multiplexers 420 and 430. Each of these note multiplexers is controlled by the signals applied to its control inputs to transmit a selected one of the signals applied to its information inputs. The control signals applied to multiplexer 420 are the bits of the note code coupled from pitch detector 200 by leads 16', and the control signals applied to multiplexer 430 are the bits of a note transpose code, which is generated as will be described in more detail hereinafter. It will be appreciated that the output signal on each of the multiplexers is one of the notes in the top octave of instrument 5.

The output signals from note multiplexers 420, 430 are provided to counters 422, 432 and to octave multiplexers 424, 434, respectively. Inasmuch as the counters count the number of pulses produce by the note multiplexers, each output of each counter is at half the frequency of the output of next lower significance. Thus, whatever input note is provided to the counters, their outputs, which correspond to bits of the count, represent the note corresponding the input note in successively lower octaves. The outputs of and the input to each of the counters 422, 432 are applied as the information input signals to the octave multiplexers 424, 434, respectively. Consequently, each of the octave multiplexers receives a top octave note plus the note corresponding to that note in each of the lower octaves. At its output, each of the octave multiplexers transmits one of its information input signals, as determined by the control signals applied to that multiplexer. The control signals applied to octave multiplexer 424 are the bits of the octave code coupled from pitch detector 200 via leads 18', and the control signals applied to octave multiplexer 434 are the bits of an octave transpose code which is generated as will be described in more detail hereinafter.

In operation, each of the note multiplexers is controlled to transmit one of the top octave notes produced by top octave decoder 410, the corresponding counter produces the same note in each of the lower octaves and the corresponding octave multiplexer is controlled to transmit either the top octave note or the corresponding note in one of the lower octaves. Thus, by selecting the note to be transmitted by means of a note multiplexer and the particular octave in which it is to lie by means of an octave multiplexer, it is possible to generate any musical note lying in the range of instrument 5.

The remaining components of automatic pitch generator 400 cooperate to control the amount of transposition between the signal on lead 26 and the signal on lead 28. These elements broadly comprise: a transpose selector 440, which is controlled by the operator to generate octave and note transpose codes representing the desired transposition, in octaves and half-step notes, between the true note on lead 28 and the transposed note on lead 26; a note transposer 450 responsive to the note code provided on leads 16' and the note transpose code from transpose selector 440 to produce a transposed note code which controls the number of musical half-steps of transposition between the signal on lead 26 and the signal on lead 28; an overflow detector 460, which senses when note transposer 450 causes the note on lead 26 to be shifted upward or downward into a different octave and indicates the same with a positive or negative overflow signal indication; and an octave transposer 470 responsive to the octave code produced on leads 18', the octave transpose code produced by selector 440 and the positive and negative overflow signals from overflow detector 460 to produce a transposed octave code which controls the number of octaves between the true note on lead 28 and the transposed note on lead 26.

Transpose selector 440 may be a conventional code generator. It includes conventional selection means such as a control panel, key board, or the like, which the operator adjusts to the desired degree of transposition in octaves and musical half-steps. The adjustment of the selection means is converted by conventional means to binary octave and note transpose codes produced on leads 442 and 444, respectively. In addition, transpose selector 440 provides a binary control signal on lead 446 which assumes a high or logical 1 state when the note transposition is to be upwards and a low or logical 0 state when the note transposition is to be downwards. A similar binary control signal is provided on lead 448 to control the direction of octave transposition.

Note transporter 450 further comprises note adder-subtracter 452, AND gate 454, OR gate 456, and unity adder-subtracter 458. The note code appearing on leads 16' and the note transpose code appearing on leads 442 are applied as inputs to note adder-substracter 452 so that the note transpose code is subtracted from the note code when adder-subtractor 452 performs a subtraction. The binary signal coupled from transpose selector 440 to the control input of adder-subtracter 452 via leads 446 and 451 controls whether the adder-subtracter 452 performs addition or subtraction. The output word of adder-subtracter 452 appears on leads 453 with the significance of the bits increasing from right to left. The most sifnificant output bits of adder-subtracter 452 are provided as the added input word to unity adder-subtracter 458. In addition, the most significant output bit is provided as an input to OR gate 456 and the two bits of next lower significance are provided as inputs to AND gate 454. The output of AND gate 454 provides the second input to OR gate 456 and the output of OR gate 456 is provided on lead 455 and is also provided as the least significant bit of the subtracted input word to adder-subtracter 458. The more significant bits of the subtracted input word (not shown) are presumed to be wired to a permanent logical 0 level. The two least significant output bits of adder-subtracter 452 are coupled directly to note multiplexer 430 as the two least significant bits of the control word and the output bits of adder-subtracter 458 are coupled to note multiplexer 430 via leads 457 as the most significant bits of the control word. The binary signal coupled from transpose selector 440 to the control input of unity adder-subtracter 458 via leads 446 and 459 controls whether unity adder-subtracter 458 performs additional subtraction.

In operation, the elements of note transposer 450 cooperate to perform arithmetic to the base 12. The words which are permissible as control inputs to multiplexer 430 range from 0000 to 1011 (see Table II), but note adder-subtracter 452 performs conventional binary arithmetic and can, therefore, produce all words ranging from 00000 to 11111. The output of AND gate 454 goes high when the four least significant ones of leads 453 include a word in excess of 1011 (i.e., 1100 or higher), and the output of OR gate 456 is high when the most significant output bit of note adder-subtracter 452 is high or when the output of AND gate 454 is high. Consequently, the output of OR gate 456 goes high whenever note adder-subtracter 452 produces a word exceeding 1011, that is, when the output word of that adder-subtracter achieves an overflow condition or word out of the range defined by Table II. When the output of OR gate 456 goes high, the number one is combined with the three most significant bits of note adder-subtracter 452. When the note adder-subtracter performs an addition, one is added to those bits and when it performs a subtraction, one is subtracted from those bits. The resulting two-bit word produced on leads 457 forms the two most significant bits of the control word to multiplexer 430 and the two least significant bits on leads 453 form the least significant bits for that control word.

As explained above, the signal on lead 455 goes high only when an overflow condition occurs in note transposer 450, indicating that the transposition of the note has shifted it upward or downward into an adjacent octave and out of the octave indicated by the code word on leads 18'. Overflow detector 460 senses when an overflow has occurred and whether the overflow is upward or downward. In the event of a downward overflow, the signal on lead 461 goes high and in the event of an upward overflow the signal on lead 463 goes high. The two inputs to AND gate 462 are provided, respectively, from OR gate 456, via lead 455, and from transpose selector 440, via leads 446 and 465; and the inputs to AND gate 464 are provided, respectively, from OR gate 456 via lead 455 and from transpose selector 440 via lead 446 and through inverter 466. The outputs of AND gates 462 and 464 are provided to leads 461 and 463, respectively. Inasmuch as AND gates 462 and 464 are each coupled to the output of OR gate 456, they will produce a logical one output only during the occurrence of an overflow condition (i.e., only when the output of OR gate 456 goes high). AND gate 462, however, will not produce a logical 1 output unless a signal on lead 446 is also high (this is a downward overflow) and the output of AND gate 464 will not produce a logical 1 output unless the signal on lead 446 is low (an upward overflow).

Octave transposer 470 serves to combine the octave code on leads 18' and the octave transpose code on leads 444. In addition, transposer 470 adds one to the resulting combination when note transposer 450 achieves an upward overflow and subtracts one from the combination when the note transposer achieves a downward overflow. Octave transposer 470 includes unity adder-subtracter 472, OR gate 474, OR gate 476, and octave adder subtracter 478. The two overflow signals on leads 461 and 463 are provided as inputs to OR gate 474 and the downward overflow signal on lead 461 is further provided as the control input to unity adder-subtracter 472. The octave code word on lead 18' is provided to unity adder-subtracter 472 as the added input word and the output signal of OR gate 474 is provided as the least significant bit of the subtracted input word. The more significant bits of the subtracted input word (not shown) are presumed to be wired to a logical zero level. The output word of unity adder-subtracter 472 is provided on lead 471 with the significance of the bits increasing from left to right. The three least significant bits of the word provided on leads 471 are coupled to octave adder-subtracter 478 as the added input word and the octave transpose code appearing on leads 44 is coupled to that adder-subtracter as the subtracted input word. A control signal is provided from transpose selector 440 to the control input of octave adder-subtracter 478, via lead 448, and controls whether the octave adder-subtracter performs addition or subtraction. The ouput word of octave adder-subtracter 478 is provided on leads 473 with significance increasing from left to right and is coupled to the control input of octave multiplexer 434 via leads 475.

In operation, the output of OR gate 474 goes high when an overflow occurs and causes a one to be combined with the octave code. One is added when the overflow is upward and subtracted when the overflow is downward. The resulting code word applied to octave adder-subtracter 478 from unity adder-subtracter 472 can be either the same as the octave code word, can exceed it by one, or can be one less, depending upon the overflow state of note transposer 450. Octave adder-subtracter 478 then combines this code word with the octave transpose code on leads 444 to achieve the desired octave transposition. This combination will be either an addition or subtraction depending upon the state of the control signal on lead 448. With the instrument 5 operating in its defined octave range (see Table I), the most significant bits of adders-subtracters 472,478 must always be zero. These bits can only assume a logical one condition when an attempt is made to transpose the note on lead 26 out of the defined range of the instrument 5. When such a condition occurs, the output of OR gate 476 goes high and indicates an alarm condition to the operator.

OCTAVE INDICATOR 500

Octave indicator 500 includes an octave display 510 and an octave display driver 520. Octave display 510 is a conventional seven segment display, for example. Octave display driver 520 receives the octave code from octave detector 210 via leads 16' and 20' and, at its outputs, produces a seven segment code for operating octave display 510. Octave display driver 520 could, for example, include a conventional binary to seven segment encoder, as well as appropriate buffer amplifiers for driving octave display 510. In operation, octave display driver 520 converts the octave code to an appropriate seven segment code representing one of the numbers between 0 and 7, and octave display 510 displays that number.

NOTE INDICATOR 600

Note indicator 600 receives the node code from note detector 250 via leads 18' and 22' and displays the corresponding alphabetic character and a sharp (where appropriate) to indicate the note which is closest in frequency to the input signal. Note indicator 600 includes: note display 610, which is responsive to the note code coupled from note detector 250 via leads 18' and 22' to produce a seven segment code for the letters A through G on leads 612 and a single bit binary (sharp) signal on leads 614. Note display driver 610 includes, for example, a decoder of conventional design which converts the codes in the right-hand column of Table II to a seven segment code representing the corresponding letter and a single binary digit representing the sharp symbol. Appropriate buffer amplifiers for note display 620 and sharp display 630 could also be included in note display driver 610. Note display 620 could, for example, be a conventional seven segment display which responds to the code on lead 612 to indicate the corresponding letter. Sharp display 630 is a conventional light emitting device, such as a light emitting diode and is connected to be illuminated when the signal on lead 614 is high. In operation, note display drive 610 responds to the note code and provides the signals to operate note display 620 and sharp display 630, which cooperate to indicate the corresponding notes as shown in the left-hand column of Table II.

TRACKING CORD GENERATOR 700

Tracking cord generator 700 receives the transposed octave code from automatic pitch generator 400 via leads 24' and the transposed note signal on lead 26 via lead 24" to provide, on lead 30, an output signal representing a harmonic accompaniment for the note on lead 26. Tracking cord generator 700 broadly comprises: transposer 710, which enables the operator to shift the accompaniment into any octave in the range of instrument 5; note generator 730, which produces a full octave of notes beginning with the lowest note of the selected octave; and a keyboard system 750 which enables the operator to select the particular notes within the two octaves of note generator 730 which will be employed for the accompaniment. In operation, the operator sets the octave range when he begins playing the instrument 5. Note generator 730 will then generate the 24 tones corresponding to two full octaves of notes, and the operator plays on keyboard system 750 to produce the actual harmonic accompanaiment desired. The output signal produced on lead 30 is a combination of all of the tones forming the harmonic accompaniment.

Transposer 710 includes octave transpose selector 712, adder-subtracter 714, counter 716 and multiplexer 718. Octave transpose selector 712 produces a transpose code on lead 713 which is provided to the added input of adder-subtractor 714, and also produces a binary control signal on lead 715 which is applied to the control input of the adder-subtracter.

The subtracted input word to adder-subtracter 714 is provided from auto pitch generator 400 via leads 24', and the output word of adder-subtracter 714 is provided via leads 717 as the control input word to multiplexer 718. The top octave note signal from auto pitch generator 400 is provided via lead 24' to counter 716 and via leads 24' and 719 to one of the information inputs of multiplexer 718. The remaining information inputs to multiplexer 718 are provided from the outputs of counter 716 and the resulting output of multiplexer 718 is provided on lead 721.

Octave transpose selector 712 is similar to transpose selector 440 of auto pitch generator 400, except it does not provide the signals which transpose selector 440 produces on leads 442 and 446. Like transpose selector 440, octave transpose selector 712 is a conventional code generator. It includes conventional selection means such as a control panel, keyboard, or the like, which the operator adjusts to the desired degree of transposition in octaves. The adjustment of the selection means is converted, by conventional means, to the binary octave code on leads 713 and the binary control signal on lead 715, the latter assuming a high or logical 1 state when transposition is to be upwards and a low or logical 0 state when transposition is to be downward.

In operation, the operator selects the desired transposition of the accompaniment and this produces a transpose code on lead 713 and a command to adder-subtracter 714 on lead 715. In adder-subtracter 714, the transpose code on leads 713 is then combined (addition or subtraction) with the octave code on leads 24' to produce a transposed note code on leads 717. In the manner of counter 432 of auto pitch generator 400, counter 716 produces, at each of its outputs, the note in a different one of the lower octaves which corresponds to the top octave note. As a result, multiplexer 716 receives, as information input signals, the top octave note and every note separated therefrom by an integral number of octaves. The control word applied to multiplexer 718 determines which of the input signals to the multiplexer is transmitted to lead 721.

Note generator 730 includes phase locked loop 732, divide-by-two counter 734, and top octave decoders 736 and 738. The information input signal to phase lock loop 732 is provided from multiplexer 718 via a lead 721 and the VCO input is provided from the lowest frequency output of top octave decoder 738 via lead 733. The VCO output of phase locked loop 732 is provided to divide-by-two counter 734 and to top octave decoder 736 via lead 735; the output of divide-by-two counter 734 is provided to top octave decoder 738 via lead 737. During operation, phase locked loop 732 causes the frequency of the VCO output to be of such a value that the frequency of the VCO input is matched to the frequency of the information input. Inasmuch as the frequency of the VCO input is matched to the frequency of the signal on lead 721, octave decoder 738 produces all 12 notes of a musical octave beginning with the note corresponding to the signal on lead 721. As a result of receiving an input signal which is twice the frequency of the input signal to top octave decoder 738, top octave decoder 736 produces all 12 notes in the octave immediately above the octave produced by decoder 738.

Keyboard assembly 750 includes: a plurality of conventional transmission gates 752 each receiving one of the outputs from top octave decoders 736, 738; a conventional keyboard 754 having a plurality of keys, each of which is connected to operate a corresponding one of the transmission gates 752; and a summing network 756 connected to receive the output of each of the transmission gates and to combine all of the outputs into a composite accompaniment signal on lead 30.

Keyboard 754 is a conventional two-octave keyboard having the appearance of a piano keyboard. Each of the keys in the keyboard includes switching means (not shown), which provides a logical 1 output signal to enable the corresponding transmission gate when the key is depressed.

Summing network 756 may be any conventional form of summing network, for example, a summing amplifier.

In operation, when a key is depressed, the note applied to the corresponding transmission gate is transmitted through the gate to summing network 756 and is there combined with all other notes so transmitted, to produce the composite signal on lead 30.

WAVEFORM GENERATOR 800

Waveform generator 800 receives the transposed note signal from auto pitch generator 400 via lead 26, applies a selectable form of waveform shaping to the signal, and combines the signal with the composite accompaniment signal received from tracking code generator via lead 30, thereby producing the output signal of instrument 5 on lead 32. Waveform generator 800 includes triangular shaper 802, sinusoidal shaper 804, transmission gates 806, 808 and 810, shape selector 812, and summing network 814. The signal on lead 26 is applied to triangular shaper 802, sinusoidal shaper 804, and transmission gate 806. The output signals of triangular shaper 804 and sinusoidal shaper 802 are applied to transmission gates 808 and 810, respectively. Shape selector 812 provides a binary output signal to control each of gates 806, 808 and 810, and the output signals of the transmission gates are applied to summing network 814 together with the composite signal appearing on lead 30. Summing network 814 produces the output signal of instrument 5 on lead 32.

Triangular shaper 802, sinusoidal shaper 804, and summing network 814 are conventional devices well known in the prior art. Shape selector 812 may be a combination of conventional switches, or the like, which can be controlled by the operator to selectively enable any of the transmission gates.

The signal appearing on lead 26 is applied directly to transmission gate 806 and is applied via the triangular shaper 802 and sinusoidal shaper 804 to transmission gates 808 and 810, respectively. The operator may operate shape selector 812 to enable any combination of transmission gates so that their signals are combined with the composite accompaniment signal in summing network 814. The output signal on lead 32 then includes the combination of the signal on lead 26 (possibly with frequency shaping), and the composite accompaniment signal. As already explained, this signal may be applied directly to an audio amplifier or to other electronic instruments such as synthesizers.

FIG. 6 illustrates an alternative embodiment 200' of pitch detector 200 and also shows an embodiment of clock 900 which is used with pitch detector 200'. The pitch detector includes an octave detector 210' and a note detector 250', which are both comprised entirely of digital circuits. Except for an oscillator, clock 900 is also comprised entirely of digital circuits. As a result of this digital construction, the accuracy of musical instrument 5 depends substantially entirely on the accuracy of the oscillator in clock 900 and is essentially unaffected by aging of components and changes in the environment, as would be the case with analog circuits.

CLOCK 900

Clock 900 includes an oscillator 910, a divide-by-P counter 920 and divide-by-10 counter 930. In the preferred embodiment, oscillator 910 is a conventional oscillator producing a 10 megahertz pulse train. The oscillator may be any conventional form of oscillator, but since the accuracy of the instrument 5 depends directly on the accuracy of the oscillator, it is preferably a precision oscillator, such as a crystal oscillator. The 10 megahertz pulse train from oscillator 910 is coupled to octave detector 210' via lead 905 and is also provided to the C inputs of divide by P counter 920 and divide by 10 counter 930. Both of these counters are reset by a signal provided from octave detector 210' via lead 225. Counter 920 produces a signal on lead 921 which has a frequency of 10/P megahertz, P being selected to make this frequency an integral multiple of the frequency of the highest note of the instrument 5. In the preferred embodiment, counter 930 produces a pulse train signal on lead 902 which has a frequency of 1 megahertz.

OCTAVE DETECTOR 210'

Octave detector 210' determines the number of pulses produced on lead 921 during each cycle of the signal on lead 12. This number is related to the frequency of the input signal and is converted to the octave code for the octave in which the input signal (on lead 12) lies. Octave detector 210' includes flip-flop 232, AND gate 234, counter 236, priority encoder 238, and storage register 240. The D input to flip-flop 232 is provided from conditioning means 100 via lead 12 and the clock input to the flip-flop is the 10 megahertz signal provided on lead 905. The Q output of flip-flop 232 is provided as one of the inputs to AND gate 234 and also appears on lead 235. The $\overline{Q}$ output of flip-flop 232 appears on lead 233 and is coupled therefrom to the reset input of counter 236, the clock input of storage register 240 and to leads 225 and 237. The second input to AND gate 234 is provided from clock 900 via lead 921, and the output of the AND gate is provided as the clock input to counter 236. The count of counter 236 is provided as the input word to priority encoder 238, the output word of priority encoder 238 is provided as the information input to storage register 240. The word stored in register 240 is provided on lead 16' as the output word of octave detector 210' and is coupled to note detector 250' via leads 204.

The 10 megahertz clock cooperates with the input signal on lead 12 to make the Q output signal of the flip-flop a replica of the input signal in which the positive-going and negative going transitions are synchronized with positive-going transitions of the 10 megahertz clock signal. AND gate 234 is enabled only when the Q output of flip-flop 232 is high. Since the signal on lead 12 is a square wave, AND gate 234 is enabled during each positive half cycle of the input signal, at which time the pulses on lead 921 are transmitted through AND gate 34 to the C input of counter 236. Thus, counter 236 counts the number of pulses appearing on lead 921 during the positive half cycle of the input signal. Priority encoder 238 senses the count of counter 236 and produces an output signal representing the counter bit of highest significance which is in a logical 1 state. The output code of priority encoder 238 is read into storage register 240 when the input signal goes low (i.e., when the $\overline{Q}$ output of flip-flop 232 goes high, and counter 236 is reset at the same time.

From the foregoing description, it will be appreciated that the value P by which counter 920 in clock 900 divides is, preferably, selected so that 10/P megahertz is related to the frequency of the highest note of the instrument 5 by an integral power of 2. The highest note of the instrument 5 would then produce an output word in counter 236 including a logical 1 in one output bit position and a logical 0 in every output bit position of lower significance. The note an octave below the highest note (i.e., the highest note in the octave just below the top octave) would produce a counter output word also having a single logical 1 output bit, but the logical 1 output bit would occur in the bit position immediately above (i.e., of higher significance) that bit position which includes a logical 1 for the top note. Thus, priority encoder 238 would not encode octaves as indicated in the foregoing Table I, but rather would encode them in the reverse of that table. Encoding as in Table I could be achieved by inverting all of the output bits of priority encoder 238. In FIG. 6, this is achieved by inserting inverters (not shown) between priority encoder 238 and storage register 240.

NOTE DETECTOR 250'

Note detector 250' determines the note that is being produced on lead 12 by counting the number of pulses occurring in the 10 megahertz clock during a single half cycle of the signal on lead 12. This is performed in a manner similar to octave detector 210'. Note detector 250' includes AND gate 252, counter 254, multiplexer 256, counter 258, memory 260, and storage register 262. AND gate 252 receives as its two input signals the 10 megahertz clock signal on lead 205 and the synchronized version of the signal from lead 12, which is provided from octave detector 210' via lead 235. Counter 254 counts pulses in the output of AND gate 252, and the count of the counter is applied as the information input word to multiplexer 256, the control or address word for multiplexer 256 is provided from octave detector 210' via leads 204, and the output of multiplexer 256 is coupled to the C input of counter 258. This counter is reset by the signal provided from octave detector 210' via led 237 and the count of the counter is applied as an address word to memory 260. The output word of memory 260 is applied as the information input word to storage register 262 under control of the signal coupled from octave detector 210' via lead 233, and the output word of storage register 262 is provided as the output of note detector 250' on leads 18'.

As was the case with AND gate 234 of octave detector 210', AND gate 252 is enabled when the Q output of flip-flop 232 goes high, so that a burst of 10 megahertz pulses is passed through AND gate 252 to counter 254.

During each burst of pulses from AND gate 252, counter 254 counts pulses and produces a continuously varying count on its output leads. Each of the signals on these output leads will be a pulse burst of a different frequency with the lead including the least significant bit having the highest frequency and the leads corresponding to bits of higher significance each having a signal at half the frequency of the bit of next lower significance. Only one of these pulse bursts is transmitted through multiplexer 256, to the counter 258, and the particular one transmitted is determined by the control word on leads 204.

In addition, the outputs of counter 254 are applied to multiplexer 256 so that the lowest magnitude octave code causes the least significant bit signal of counter 254 to be transmitted through the multiplexer, while octave code words of increasing magnitude output signals of increasing significance to be transmitted. It will, therefore, be appreciated that when the input signal on lead 12 is in the lowest octave the highest frequency (least significant) output of counter 254 is transmitted through the multiplexer 256, and when the input signal 12 is in the next to lowest octave, the multiplexer will transmit a signal which has half the frequency of the least significant bit signal. The signal transmitted by multiplexer 256 is progressively halved as the input signal on lead 12 lies in progressively higher octaves. Thus, the signal applied to the C input of counter 258 is at a variable frequency depending on the octave in which the input signal on lead 12 is located. This permits the note to be detected with equal resolution regardless of the octave in which it is located and permits counter 258 to be of moderate size. If counter 258 were operated with a clock input of fixed frequency, it would have to be of sufficient size to provide the desired resolution when the input signal on lead 12 included notes in the top octave. Thus, the size of the counter could become unnecessarily large in order to accommodate bottom octave notes which could require the counter to count 256 times as many pulses as the top octave notes. In effect, note detector 250' always detects notes in the top octave, as did note detector 250, so that the resolution and size of counter 258 can be fixed at a desired level.

Counter 258 produces a continuum of counts corresponding to the number of pulses produced by all frequencies within the range of an octave. Memory 260 resolves each of these counts to one of twelve code words, each of which correspond to one of the twelve notes in an octave. Memory 260 could, for example, be a special purpose read only memory which is designed to produce the appropriate note codes in response to certain input words. This memory could, however, also be a programmable or random access memory so that certain counts of counter 258 could be programmed to produce certain note codes. This would be particularly useful for tuning a piano, since pianos are not normally tuned to a perfect tempered scale, but are often intentionally tuned to be slightly off in frequency. A random access memory would permit such slight deviations to be programmed in by the operator. As an alternative, it would also be possible to provide a plurality of interchangeable memory units so that the operator could select and use the unit he desired to achieve special decoding of the count of counter 258 in the case of piano tuning, or in other similar situations. The note code provided by memory 260 is stored in register 262 on the negative going transition of the input signal and then becomes available on leads 18'.

WAVEFORM GENERATOR 800'

FIG. 7 illustrates an alternate embodiment 800' of waveform generator 800. Waveform generator 800' broadly comprises: a digital time base generator 820 which generates a time reference for the transposed true note signal appearing on lead 26; a digital wave shaping network 830 providing a plurality of differently shaped waveforms; a plurality of transmission gates 850a, 850b ... 850m, corresponding to transmission gates 806, 808, 810 of waveform generator 800 and shape selector 812 and summing network 814 corresponding, respectively, to the same elements in waveform generator 800. The waveforms provided by wave shaper 830 are each provided to a different one of the transmission gates and the operator controls shape selector 812 to determine which gates are enabled and, therefore, which wave shapes are applied to and combined in summing network 814 to produce the composite output on lead 32.

Time base generator 820 serves to divide each cycle of the signal on lead 26 into a plurality (N) of sub-intervals. The time base generator includes a phase-locked loop 822, a divide-by-N counter 824 and a counter 826. The signal on lead 26 is provided as the information input signal to phase-locked loop 822 and the VCO output of the phase-locked loop is applied to counter 826 and is fed back through divide-by-N counter 824 to the VCO input. In operation, the phase-locked loop adjusts the frequency of the VCO output so that the frequency of the VCO input is matched to the frequency of the transposed true note signal appearing on lead 26. This means that the frequency of the VCO output signal will be exactly N times the frequency of the transposed note signal appearing on lead 26. Counter 826 is a conventional N-1 bit counter which counts pulses in the VCO output signal. It will therefore be appreciated that during each cycle of the transposed note signal counter 826 will count from 0 to N-1 in response to the N pulses produced at the VCO output. Counter 826 cycles repetitively through its counts and, in effect, divides each period of the transposed true note signal into N sub-intervals, each defined by a different count of the counter.

Wave shaper 830 responds to the sequence of counts from counter 826 and produces a plurality of different pulse trains, in each of which trains the pulses have a different shape. Wave shaper 830 includes a digital-to-analog converter 832 and a plurality of shaping networks 834, each of which includes a memory 836 and a digital to analog converter 838. During each cycle of counter 826, digital-to-analog converter 832 produces an output signal which increases in amplitude with each increasing count of counter 826, but which returns to 0 when the counter 826 returns to its 0 count. Thus, digital to analog converter 832 produces a sawtooth waveform. Each of the memories 836 is designed to produce a different sequence of output code words in response to the count sequence of counter 826. Thus, digital to analog converters 838 will each provide a different stepped analog waveform at their outputs. In some cases, it may be desirable to filter the outputs of digital to analog converter 832 and digital to analog converters 838 in order to smooth out the stepped output before applying it to the transmission gates. The transmission gates, shape selector and summing network operate in the same manner as the corresponding elements of waveform generator 800 to provide the composite accompaniment waveform on lead 32.

In the preferred embodiment, memories 836 are a set of specially designed read-only memories, but these memories could be replaced by conventional decoding network designed to provide the desired code to the corresponding digital to analog converter. For example, a triangular waveform would be produced by providing a decoder which converted the continuously increasing count of counter 826 to a code sequence which increased during the first half of the cycle of that counter and decreased during the second half of the cycle of that counter. It will be apparent to those skilled in the art that memories or decoders could be designed to yield stepped approximations to pulses having various other wave shapes, such as sinusoidal pulses. It will also be appreciated that memories 836 could be made programmable to enable the operator to produce any desired wave shape or that interchangeable memory units could be provided to enable the operator to select between pulses of various wave shapes.

Although specific embodiments of the invention have been disclosed for illustrative purposes, it will be appreciated by those skilled in the art that various modifications, additions, and substitutions, are possible without departing from the scope and spirit of the invention as defined by the accompanying claims.

What is claimed is:

1. In a musical instrument responding to an applied input signal by producing an output signal including at least one of a plurality of signals of different predetermined pitch, which signals lie in a continuum of octaves and correspond to notes of a musical scale within each octave, the combination of:
   an octave detector responsive to said input signal for producing an octave code signal;
   a note detector jointly responsive to said input signal and said octave code signal for producing a note code signal, said note detector including frequency shifting means controlled by said octave code signal and operating on said input signal to shift said input signal into a fixed octave, said note detector determining, within said fixed octave, the note corresponding to said input signal; and
   a pitch generator jointly responsive to said octave and note code signals for producing a true pitch signal in the octave corresponding to said octave code signal and having a frequency corresponding to said note code signal.

2. The instrument of claim 1 further including a source of a clock signal which is substantially higher in frequency than the highest predetermined pitch signal, said pitch generator comprising frequency dividing means operating on said clock signal and controlled by said octave and note code signals, said dividing means dividing said clock signal frequency by a variable integer which is determined by the values of said octave and note codes.

3. The instrument of claim 1 further comprising display means jointly responsive to said note and octave code signals to indicate the octave and note corresponding thereto.

4. The instrument of claim 1 further comprising means differentially responsive to said input signal and said true pitch signal to indicate when said input signal exceeds and fails to exceed said true pitch signal in frequency.

5. The instrument of claim 1 wherein said output signal includes at least said true pitch signal, said instrument further comprising a chord generator responsive to said true pitch signal and operable to produce a harmonic accompaniment corresponding thereto, said chord generator including means for controlling the notes included in said accompaniment which tracks the frequency of said true pitch signal.

6. The instrument of claim 5 wherein said note controlling means comprises:
   means for multiplying the frequency of said true pitch signal by a predefined integer to produce a high frequency signal;
   means for simultaneously frequency dividing said high frequency signal by a plurality of different integers to yield a plurality of different predetermined pitch signals for use in said accompaniment; and
   means for selecting at least one predetermined pitch signal to be included in said accompaniment.

7. The instrument of claim 5 further comprising a waveform generator including:
   means for shaping said true pitch signal to provide a plurality of shaped signals of the same frequency, each having a different form of shaping; and
   means for combining selected ones of said shaped signals with said accompaniment to produce said output signal.

8. An instrument in accordance with claim 7 wherein said shaping means comprises:
   means responsive to said true pitch signal for producing a fixed sequence of different code words repeating at the frequency of said true pitch signal;
   means responsive to said code word sequence for producing a plurality of different modified code word sequences each repeating at the frequency of said true pitch signal; and
   means for converting each of said modified code word sequences to a different corresponding one of said shaped signals, in which one signal the amplitude varies in proportion to the magnitude of the corresponding modified code word.

9. In a musical instrument responding to an applied input signal by producing an output signal including at least one of a plurality of signals of different predetermined pitch, which signals lie in a continuum of octaves and correspond to notes of a musical scale within each octave, the combination of:
   a pitch detector responsive to said input signal for producing an octave code signal representing the octave including said input signal and a note code signal representing the note corresponding to the predetermined pitch signal which is closest in frequency to said input signal;
   a source of octave transpose code and note transpose code signals representing a selected transposition for said true pitch signal;
   means for combining said octave code signal with said octave transpose code signal and said note code signal with said note transpose code signal to yield combined note code and octave code signals; and
   a pitch generator jointly responsive to said combined octave and note code signals for producing a transposed true pitch signal in the octave corresponding to said combined octave code signal and having a frequency corresponding to said combined note code signal.

10. The instrument of claim 9 wherein said pitch detector comprises:
    an octave detector responsive to said input signal for producing said octave code signal; and
    a note detector jointly responsive to said input signal and said octave code signal for producing said note code signal, said note detector including means controlled by said octave code signal and operating on said input signal to determine, within a predetermined octave, the note corresponding to said input signal.

11. The instrument of claim 9 further including a source of a clock signal which is substantially higher in frequency than the highest predetermined pitch signal, said pitch generator comprising frequency dividing means operating on said clock signal and controlled by said octave and note code signals, said dividing means dividing said clock signal frequency by a variable integer which is determined by the values of said octave and note codes.

12. The instrument of claim 9 wherein said output signal includes at least said transposed true pitch signal, said instrument further comprising a chord generator responsive to said transposed true pitch signal and operable to produce a harmonic accompaniment corresponding thereto, said chord generator including means for controlling the notes included in said accompaniment which tracks the frequency of said transposed true pitch signal.

13. The instrument of claim 9 further comprising display means jointly responsive to said note and octave code signals to indicate the octave and note corresponding thereto.

14. The instrument of claim 9 further comprising means differentially responsive to said input signal and said true pitch signal to indicate when said input signal exceeds and fails to exceed said true pitch signal in frequency.

15. The instrument of claim 9 further comprising a waveform generator including:
  means for shaping said transposed true pitch signal to provide a plurality of shaped signals of the same frequency, each having a different form of shaping; and
  means for combining selected ones of said shaped signals with said accompaniment to produce said output signal.

16. An instrument in accordance with claim 15 wherein said shaping means comprises:
  means responsive to said transposed true pitch signal for producing a sequence of code words repeating at the frequency of said transposed true pitch signal;
  means responsive to said code word sequence for producing a plurality of different modified code word sequences each repeating at the frequency of said transposed true pitch signal; and
  means for converting each of said modified code word sequences to a different corresponding one of said shaped signals, in which one signal the amplitude varies in proportion to the magnitude of the corresponding modified code word.

17. In an electronic musical instrument capable of producing an output signal including at least one of a plurality of signals of different predetermined pitch, which signals lie in a continuum of octaves and correspond to notes of a musical scale within each octave, a pitch detector for detecting which of said predetermined pitch signals is closest in frequency to an applied input signal, said pitch detector comprising:
  an octave detector responsive to said input signal for producing an octave code signal representing the octave which includes said input signal; and
  a note detector jointly responsive to said input signal and said octave code signal to produce a note code signal representing the note corresponding to said closest predetermined pitch signal, said note detector including frequency shifting means controlled by said octave code signal and operating on said input signal to shift said input signal into a fixed octave, said note detector determining, within said fixed octave, the note corresponding to said input signal.

18. The musical instrument in accordance with claim 17 further including a source of clock pulses at a frequency substantially higher than the highest of said predetermined pitch signals, said octave detector comprising:
  counting means jointly responsive to said input signal and said clock pulses and actuated during a predefined portion of each cycle of said input signal for counting said clock pulses; and
  means reponsive to the count obtained by said counting means for producing a signal corresponding to the octave code signal which is closest in magnitude to said count.

19. The musical instrument in accordance with claim 17 further including a source of clock pulses at a frequency substantially higher than the highest of said predetermined pitch signals, said note detector comprising:
  frequency dividing means operative on said clock pulses and controlled by said octave code signal for dividing the frequency of said clock pulses by a variable integer determined by the value of said octave code signal, thereby providing a divided clock signal;
  counting means actuated during a predefined portion of each cycle of said input signal for counting pulses in said divided clock signal; and
  means responsive to the count obtained by said counting means for producing a signal corresponding to the note code signal which is closest in magnitude to said count.

20. In an electronic musical instrument capable of producing an output signal including at least one of a plurality of signals of different predetermined pitch, which signals lie in a continuum of octaves and correspond to notes of a musical scale within each octave, a pitch detector for detecting which of said predetermined pitch signals is closest in frequency to an applied input signal, said pitch detector comprising:
  an octave detector responsive to said input signal for producing an octave code signal representing the octave which includes said input signal; means operating on said input signal for producing a shifted input signal having a frequency which is in a selectable ratio with said input signal frequency, said producing means including means controlled by said octave code signal for selecting said ratio in relationship to the value of said octave code signal so that said shifted input signal is disposed in a predefined octave;
  a frequency-to-amplitude converter responsive to said shifted input signal for producing an output signal having an amplitude dependent on the frequency of said shifted input signal;
  a source of a plurality of reference amplitude signals, each signal corresponding to a predetermined frequency related to a different note in said predefined octave; and
  coding means jointly responsive to said frequency-to-amplitude converter output signal and said reference signal to provide a note code signal representing the reference signal nearest in amplitude to said frequency-to-amplitude converter output signal.

21. The pitch detector in accordance with claim 20 wherein said producing means comprises:
  means for multiplying the frequency of said input signal by a predefined integer to produce a high frequency signal; and frequency dividing means operating on said high frequency signal and controlled by said octave code signal to divide the frequenc of said high frequency signal by a variable integer determined by the value of said octave code signal.

22. A method for use in a musical instrument including a variable frequency generator for producing an output signal including at least one of a plurality of signals of different predetermined pitch, which signals lie in a continuum of octaves and correspond to notes of a musical scale within each octave, said method being effective to make said output signal correspond to the predetermined pitch signal which is closest in frequency to an applied input signal, said method comprising the steps of:

determining which octave includes said input signal;

producing a shifted input signal having a frequency which is in a selectable ratio with said input signal frequency, said ratio being selected in relationship to the value of said octave code signal so that said shifted input signal is always disposed in the same predefined octave; and determining which note in said predefined octave most closely corresponds to said input signal;

generating an octave code signal and anote code signal representing, respectively, said octave including said input signal and said note corresponding to said input signal; and controlling said variable frequency generator with said octave and note code signals so that the frequency of said generator output signal is the same as said closest predetermined pitch signal.

23. A method for use in a musical instrument including a variable frequency generator for producing an output signal including at least one of a plurality of signals of different predetermined pitch, which signals lie in a continuum of octaves and correspond to notes of a musical scale within each octave, said method being effective to make said output signal correspond to the predetermined pitch signal which is closest in frequency to an applied input signal, said method comprising the steps of:

generating a clock pulse signal at a frequency substantially higher than the highest of said predetermined pitch signals;

dividing the frequency of said clock pulse signal by a variable integer determined by the magnitude of said octave code signal, thereby providing a divided clock signal;

during a predefined portion of each cycle of said input signal, counting pulses in said divided clock signal; and choosing as the closest note that note which has a note code signal which is closest in magnitude to the divided clock signal pulse count generating an octave code signal and anote code signal representing, respectively, said octave including said input signal and said note corresponding to said input signal; and controlling said variable frequency generator with said octave and note code signals so that the frequency of said generator output signal is the same as said closest predetermined pitch signal.

24. A method for use in a musical instrument including a variable frequency generator for producing an output signal including at least one of a plurality of signals of different predetermined pitch, which signals lie in a continuum of octaves and correspond to notes of a musical scale within each octave, said method being effective to make said output signal correspond to the predetermined pitch signal which is closest in frequency to an applied input signal and to produce an accompaniment which tracks the frequency thereof, said method comprising the steps of:

detecting which octave includes said input signal and which note in that octave is closest in frequency to said input signal;

generating an octave code signal and anote code signal representing, respectivey, said octave including said input signal and said note corresponding to said input signal;

controlling said variable frequency generator with said octave and note code signals so that the frequency of said generator output signal is the same as said closest predetermined pitch signal multiplying the frequency of said true pitch signal by a predefined integer to produce a high frequency signal;

generating a plurality of different predetermined pitch signals which are different integer sub-multiples of said high frequency signal; and selecting at least one of said predetermined pitch signals to be included in said accompaniment.

25. In combination with the method of claim 30, the method of producing a composite output signal for said instrument comprising the steps of:

generating a plurality of shaped signals each having the same frequency as said input signal but a different waveform shaping; and combining selected ones of said shaped signals with said accompaniment to produce said composite output signal.

26. The method of claim 25 wherein said shaped signal generating step includes the steps of:

producing a fixed sequence of different code words repeating at the frequency of said input signal;

operating on said code word sequence to produce a plurality of different modified code word sequences each repeating at the frequency of said input signal; and converting each of said modified code word sequences to a different corresponding one of said shaped signals, in which one signal the amplitude varies in proportion to the magnitude of the corresponding modified code word.

27. A method for use in a musical instrument including a variable frequency generator for producing an output signal including at least one of a plurality of signals of different predetermined pitch, which signals lie in a continuum of octaves and correspond to notes of a musical scale within each octave, said method being effective to make said output signal correspond to a selectively transposed version of the predetermined pitch signal which is closest in frequency to an applied input signal, said method comprising the steps of:

detecting which octave includes said input signal and which note in that octave is closest in frequency to said input signal;

generating an octave code signal and anote code signal representing, respectively, said octave including said input signal and said note corresponding to said input signal;

generating octave transpose code and note transpose code signals representing the selected transposition of said true pitch signal;

combining said octave code signal with said octave transpose code signal and said note code signal with said note transpose code signal to yield combined note code and octave code signals; and controlling said variable frequency generator with said combined note code and octave code signals so that the frequency of said generator output signal is a selectively transposed version of said closest predetermined pitch signal.

28. In an electronic musical instrument capable of producing an output signal including at least one of a plurality of signals of different predetermined pitch, which signals lie in a continuum of octaves and correspond to notes of a musical scale within each octave, a method for detecting the octave including said input signal and the note in said octave most closely corresponding thereto, comprising the steps of:

determining which octave includes said input signal;

producing a shifted input signal having a frequency which is in a selectable ratio with said input signal frequency, said ratio being selected in relationship to the octave determined to include said input signal, so that said shifted input signal is always disposed in the same predefined octave; and determining which note in said predefined octave most closely corresponds to said shifted input signal.

29. The method in accordance with claim 28 wherein said octave-determining step comprises the steps of:

generating a clock signal having pulses at a frequency substantially higher than the highest of said predetermined pitch signals;

during a predefined portion of each cycle of said input signal, counting said clock pulses;

generating a plurality of octave code signals each representing the pulse count corresponding to a predefined frequency in a different one of said octaves; and choosing as the octave including said input signal that one octave having an octave signal which is closest in magnitude to the clock pulse count.

30. In an electronic musical instrument capable of producing an output signal including at least one of a plurality of signals of different predetermined pitch, which signals lie in a continuum of octaves and correspond to notes of a musical scale within each octave, a method for detecting the octave including said input signal and the note in said octave most closely corresponding thereto, comprising the steps of:

producing a first signal having an amplitude dependent on the frequency of said input signal;

generating a plurality of reference amplitude signals, each corresponding to a predetermined frequency in a different octave;

selecting as the octave which includes said input signal that octave corresponding to the reference signal which is nearest in amplitude to said first amplitude signal;

producing a shifted input signal having a frequency which is in a selectable ratio with said input signal frequency, said ratio being selected in relationship to the octave determined to include said input signal, so that said shifted input signal is always disposed in the same predefined octave; and determining which note in said predefined octave most closely corresponds to said shifted input signal.

31. In an electronic musical instrument capable of producing an output signal including at least one of a plurality of signals of different predetermined pitch, which signals lie in a continuum of octaves and correspond to notes of a musical scale within each octave, a pitch detector for detecting which of said predetermined pitch signals is closest in frequency to an applied input signal, said pitch detector comprising:

a frequency-to-amplitude converter responsive to said input signal for producing an output signal having an amplitude dependent on the frequency of said input signal;

a source of a plurality of reference amplitude signals, each signal corresponding to a predetermined frequency in a different octave;

coding means jointly responsive to said frequency-to-amplitude converter output signal and said reference signal to provide a code signal representing the reference signal nearest in amplitude to said frequency-to-amplitude converter output signal, which code signal is said octave code signal; and a note detector jointly responsive to said input signal and said octave code signal to produce a note code signal representing the note corresponding to said closest predetermined pitch signal, said note detector including means controlled by said octave code signal and operating on said input signal to determine, within a predetermined octave, the note corresponding to said input signal.

* * * * *